United States Patent [19]

Assad

[11] 4,167,357

[45] Sep. 11, 1979

[54] RAPID CONSTRUCTION OF DEEP INTERNATIONAL PORTS, AT SHALLOW SEASHORES, WITHOUT DREDGING

[76] Inventor: Ahmed A. Assad, P.O. Box 37, El Cerrito, Calif. 94530

[21] Appl. No.: 897,927

[22] Filed: May 5, 1978

[51] Int. Cl.² .................................................. B63C 1/00
[52] U.S. Cl. ........................................... 405/1; 405/52; 405/132; 405/303
[58] Field of Search .................... 61/1 R, 35, 63, 86, 61/64, 65, 48

[56] References Cited

U.S. PATENT DOCUMENTS

| 2,945,465 | 7/1960 | Barton | 61/1 R X |
| 3,472,033 | 10/1969 | Brown | 61/1 R X |
| 3,680,320 | 8/1972 | Goodboy et al. | 61/1 R X |

OTHER PUBLICATIONS

Engineering News-Record, Jan. 31, 1963, pp. 30–32.

Primary Examiner—Dennis L. Taylor

[57] ABSTRACT

A method of construction whereby facilities can be provided for the docking of vessels or relatively large draft, all dredging operations being dispensed with.

3 Claims, 5 Drawing Figures

EXISTING VIRGIN SEASHORE PLAN

EXISTING VIRGIN SEASHORE PLAN

EXISTING VIRGIN SEASHORE PLAN
(WITH PROPOSED DEEP WATER PIER SITE)

NEW DEEP WATER PIER PROSPECTIVE

NEW DEEP WATER PIER PLAN

, 357

RAPID CONSTRUCTION OF DEEP INTERNATIONAL PORTS, AT SHALLOW SEASHORES, WITHOUT DREDGING

SUMMARY OF THE INVENTION

There are many places throughout the world today having coastal areas embracing sites which offer possibilities for almost unrestricted industrial development. Of course, one of the major items of any such contemplated development would be the provision of facilities for the docking and unloading of vessels, bringing material, machinery and other necessary supplies. Such ventures could include the construction of shipyards with adequate launching facilities and drydocks.

A further possibility would be the provision of underwater storage facilities.

It is object of the present invention to provide a method of accomplishing the foregoing economically, expeditiously, and with all operations being conducted on dry land.

This and other objects of the invention will become apparent during the course of the foll owing description and appended claims, taken in connection with the accompanying drawings forming a part hereof.

DESCRIPTION OF THE PREFERRED EMBODIMENT

Figure 1:
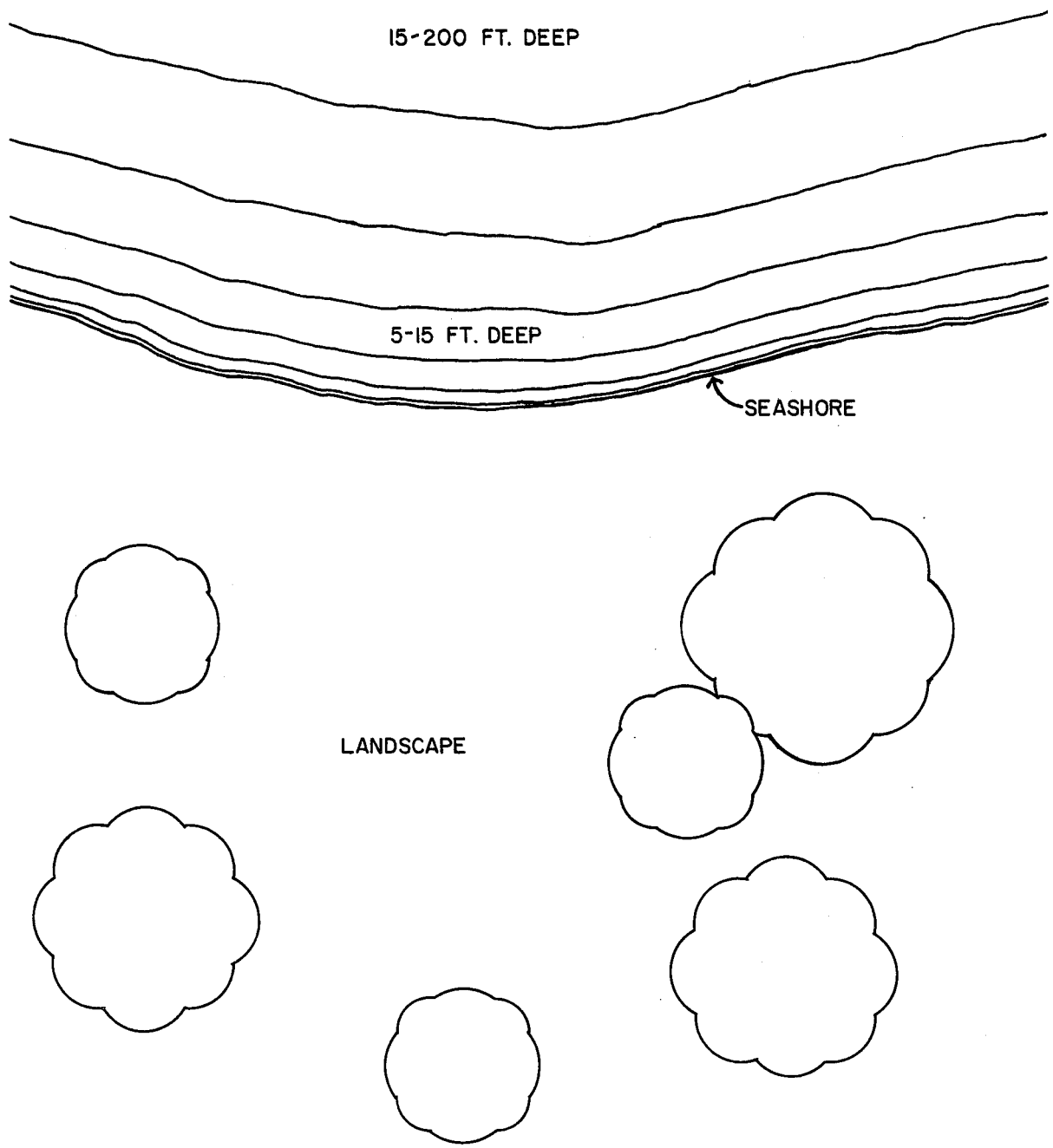
FIG. 1 is a plot plan of a typical site in its natural condition.
Figure 2:
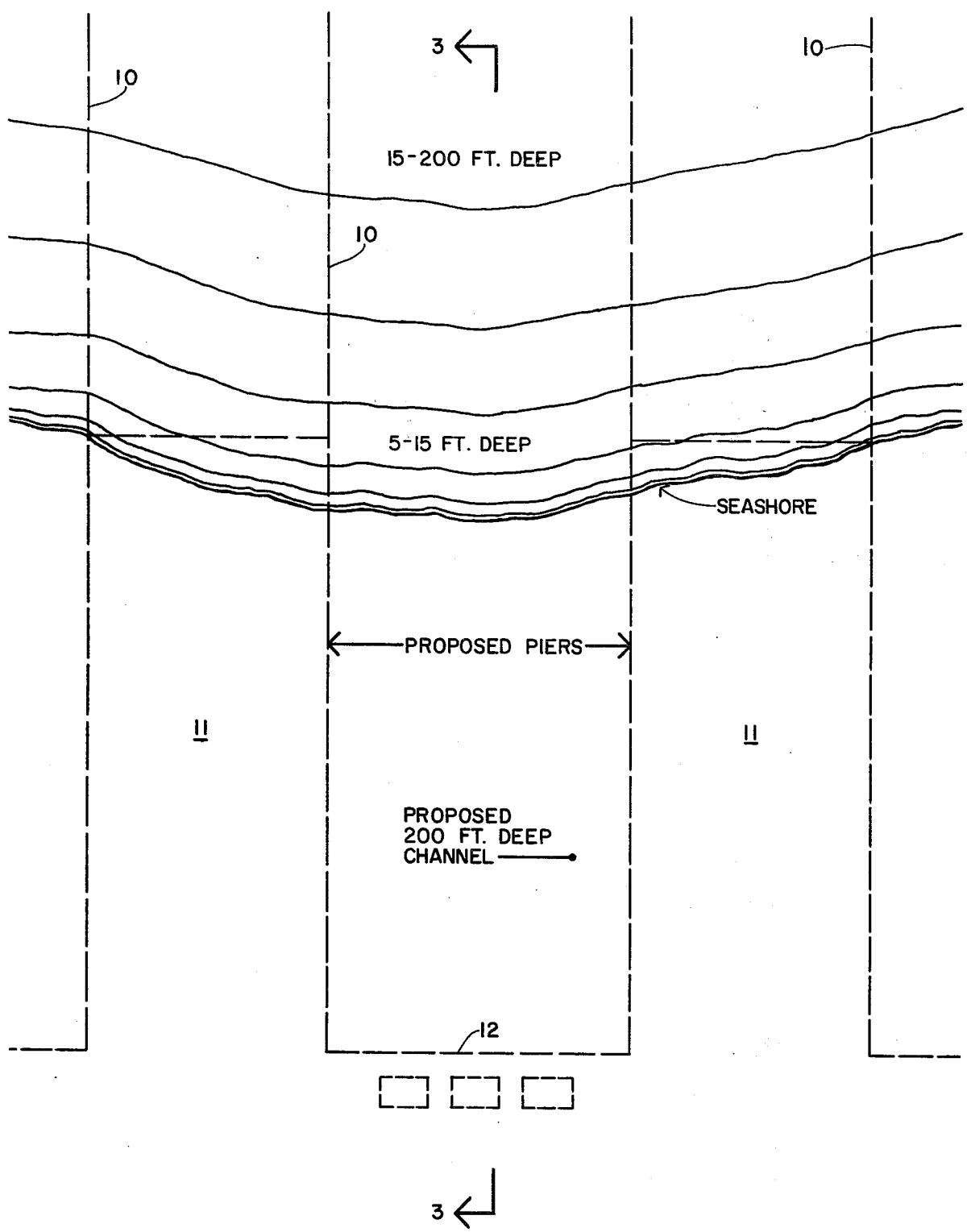
FIG. 2 indicates a preliminary layout of construction to be performed at a site as indicated on FIG. 1.

Referring to the drawing in detail, FIG. 1 indicates a typical situation where natural resources, accessibility, adjacent topography and other contingencies would make the construction of adequate seaport facilities an extremely worthwhile venture. As further shown on FIG. 2 it is proposed to establish one more channels 10, with dockside facillities 11 as outlined in broken lines thereon.

Figure 3:
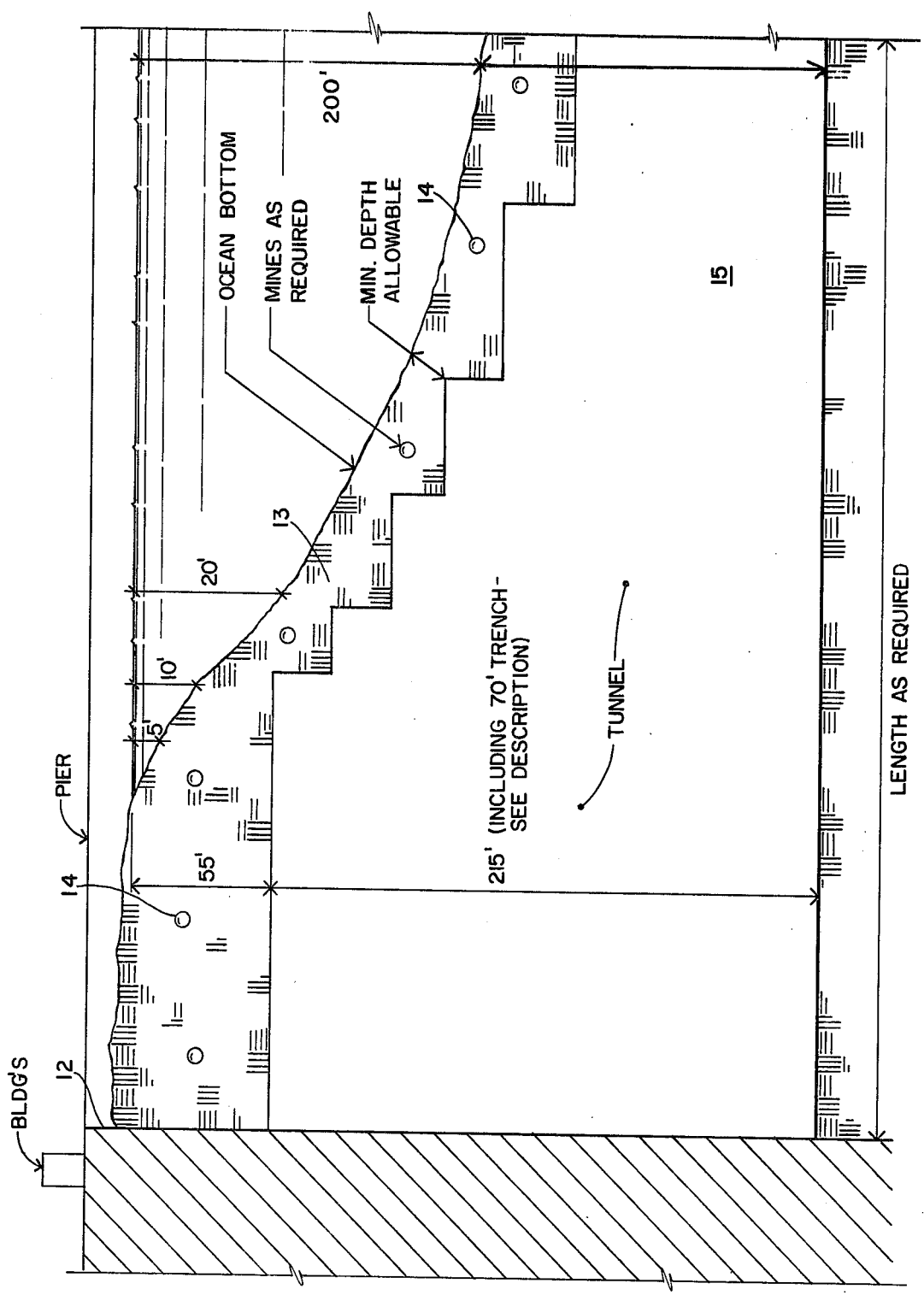
FIG. 3 is a longitudinal vertical section as would be seen on line 3—3 of FIG. 2 when construction has advanced to that point.

Of course, such facilities are to be considered as an adjunct to the construction of the channels, the method of construction of said channels being the issue or purpose of this application. With particular reference to FIG. 3, it will be necessary to establish a reference plane elevation, usually mean low water and take the necessary soundings in order to establish a profile of the water bed in the area of operation.

An exavation will then be made from a predetermined point, established by the physical dimensions of the undertaking and extending to point 12 located above the level of the high water mark.

The second step will be tunnel under the water as indicated. The extent of this operation being determined by the profile of the sea bed as previously established. All work will be in conformance with approved engineering practise and observance of existing safety regulations. In this operation, the design depth of the channel will be exceeded by a sufficient amount to accomodate the material 13 which will be displaced by the blasting or other approved method, this being part of the third step.

The third step contemplates the placing of explosive charges 14 as indicated which, upon being detonated, will cause the collapse of the material 13, which will be deposited in the space 15, provided by the additional exacavation beyond the designed channel depth. The channel will now extend from the innermost point of exavation to a point offshore where the designed depth and natural depth coincide.

While in some case it may be practical to detonate all charges simultaneously, individual studies will be made of each project in order to establish a pattern and sequence which will promote the success of the operation and which will ensure the safety of the members of the construction crew.

Figure 4:
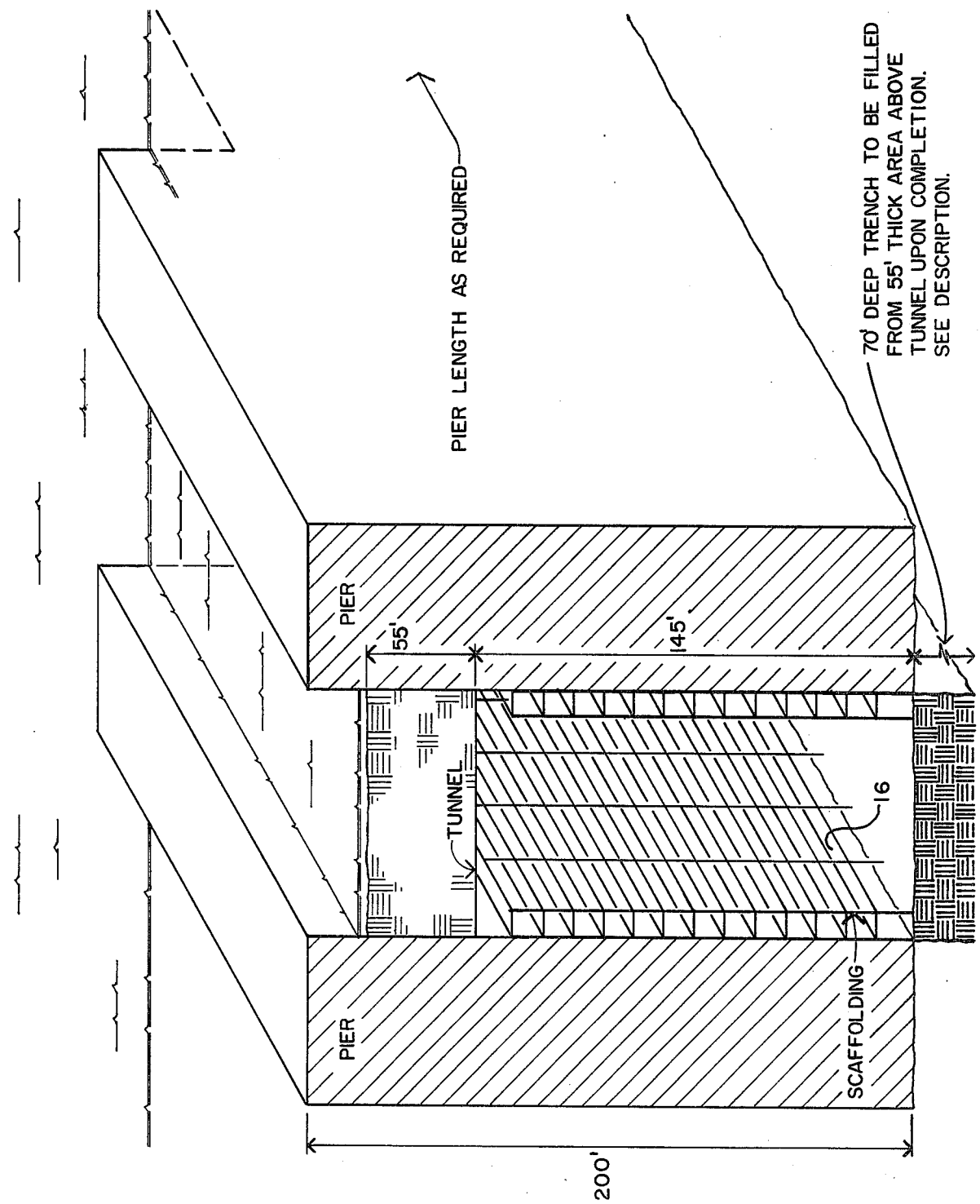
FIG. 4 is a perspective view of the construction indicated on FIG. 3.
Figure 5:
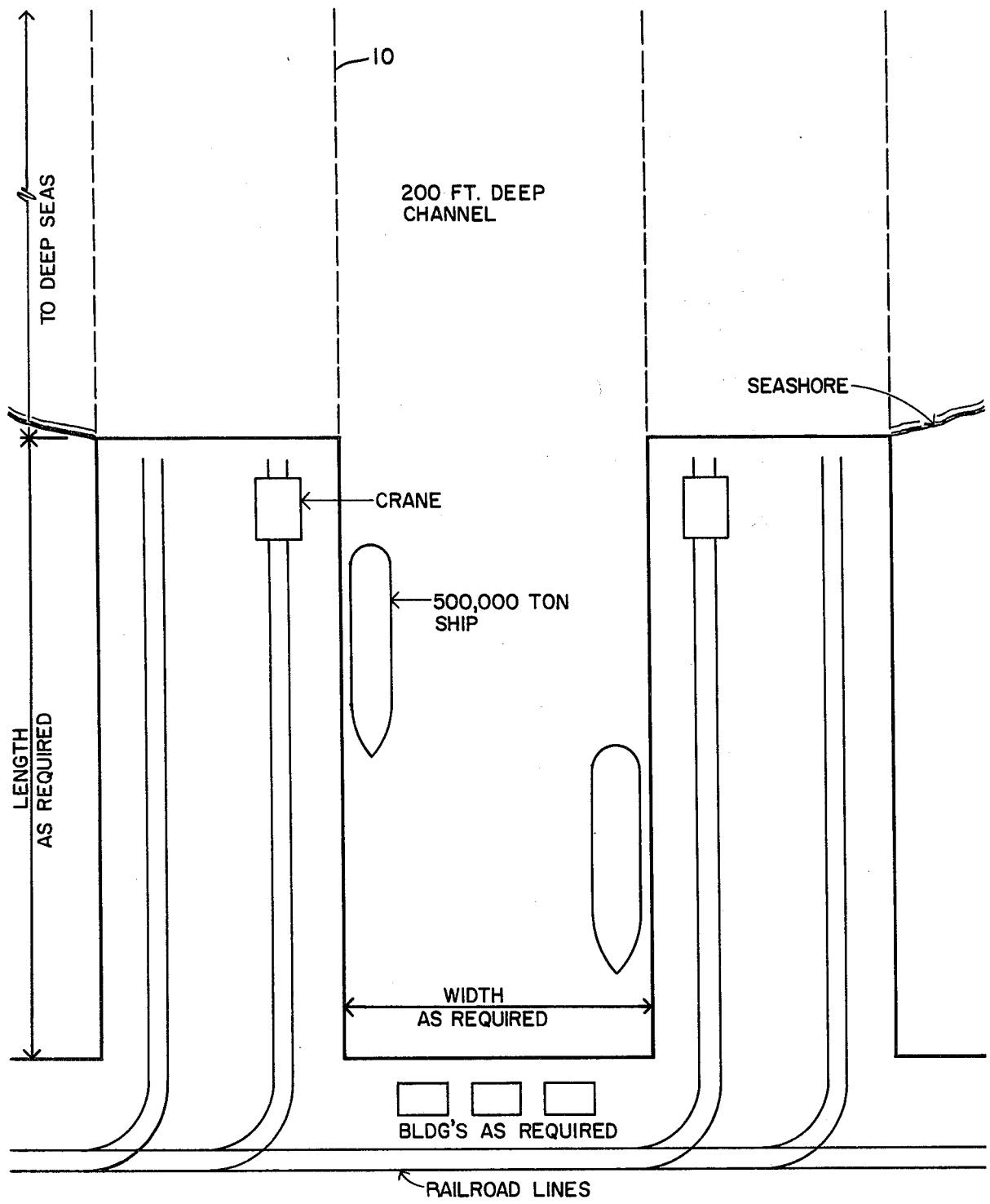
FIG. 5 is a plan view of a completed seaport facility.

As the work progresses prior to this point, shoring 16, as indicated on FIG. 4, or other approved means such as sheet piling will be used to prevent cave-ins erosion or other undesirable material displacement. The extent and type of such operations will be determined by local geological conditions and safety regulations. The shoring 16 can be of a temporary or permanent nature, and additional construction can be performed contingent upon necessity and economic considerations. Having provided an inwardly extending channel, this will, as previously stated, allow the project to be utilized for various purposes.

For ship construction and repair, launching ways can be erected and lock gates can be installed for dry dock facilities.

The channels can also be used as underwater storage areas for such hazardous materials as liquid natural gas. From a military standpoint, submarines could be berthed in complete concealment. From the foregoing it will be apparent thet I have provided a method of construction of seaport facilities which, by dispensing with resort to dredging, will result in a more practical, more economical and more expeditious operation. While I have illustrated and described a preferred embodiment of my invention, it will be understood that modifications may be made within the spirit and intent of Title 35, United States Code, Section 112, Paragraph 3.

I claim:

1. A method of providing docking facilities consisting of excavating adjacent to a body of water, said excavation being of a predetermined width and depth, and extending from a point above the high water level of said body of water to a point inland determined by the length of said facility; extending the lower portion of said excavation by tunneling under said body of water to a point where the designed depth of said facility substantially coincides with the level of the bed of said body of water and then effecting the removal of all material separating said tunnel and said water.

2. A method as in claim 1 wherein said material separating operation consists of placing and detonating explosive charges.

3. A method as in claim 1 wherein said facility is provided with a system of lock gates.

* * * * *